UNITED STATES PATENT OFFICE 2,599,339

COMPOSITIONS CONTAINING A MAJOR AMOUNT OF A WAX AND A MINOR AMOUNT OF A COPOLYMER OF ETHYLENE-1,2-DICARBOXYLIC ACIDS AND THEIR DERIVATIVES

Samuel B. Lippincott, Westfield, and David W. Young, Roselle, N. J., assignors to Standard Oil Development Company, a corporation of Delaware No Drawing. Application December 8, 1949,
Serial No. 131,916

3 Claims. (Cl. 260—23.5)

This invention relates to improved wax compositions and methods of preparing same. According to the present invention, various types of waxes are compounded with soluble derivatives of copolymers of ethylene-1,2-dicarboxylic acids and their derivatives with other unsaturated compounds, such as olefins, vinyl ethers, vinyl esters and the like. The dicarboxylic acids which may be employed include maleic acid, fumaric acid, the mono or dichloro substituted maleic and fumaric acids, alkylated maleic and fumaric acids, mono and diphenyl maleic, benzyl maleic, dibenzyl maleic, ethyl maleic or any similar acids containing a double bond in the chain between the two carboxyl groups, such as mesaconic and citraconic. Acids where the double bond has shifted from the 1,2 position, such as itaconic and glutaconic acid may also be used. The anhydrides of each of the above acids capable of anhydride formation may also be used. After the copolymerization, the copolymer is modified with an alcohol or amine. Among the unsaturated compounds useful in the copolymerization with ethylene-1,2-dicarboxylic acid or its derivatives are (1) ordinary olefins such as ethylene, propylene, butylene, octylene and octadecene; (2) unsaturated acids such as acrylic acid, methacrylic acid, crotonic acid, undecylenic acid, oleic acid, and their esters; (3) unsaturated esters such as vinyl acetates, allyl stearate and the like; (4) unsaturated ethers such as vinyl dodecyl ether, butyl allyl ether and the like; (5) sulfides corresponding to the above ethers; (6) unsaturated chlorides such as vinyl and methallyl chloride.

In general, when an olefin is copolymerized, the two monomers enter into the copolymer at approximately an equimolar ratio. The copolymers are generally insoluble waxes except when a high molecular weight long chain olefin has been used in the copolymerization. However, they can be made soluble by modification with various aliphatic substances such as alcohols, primary amines, secondary amines, mercaptans and the like. When condensed with an alcohol, the initial product is a half ester. The remaining carboxyl groups may be left as such or may be esterified with the same or a different alcohol or they may also be neutralized with ammonia, amines and the like, and the salts formed may be converted to amides by the removal of water. If the copolymer is treated with a primary amine, the resulting product is at least partly an imide, i. e., a RN- group replaces the oxygen in the acid anhydride groups of the copolymer. If it is treated with a secondary amine, the resulting product is probably an amide. The copolymer may also be condensed with a mercaptan to yield the half thioester which in turn may be further esterified with an alcohol or condensed with ammonia or an amine. If the copolymer is wax soluble, low molecular weight modifying agents, such as ethyl alcohol and methylamine, may be used. However, if the copolymer is insoluble, the modifying agent must carry sufficient carbon and hydrogen to render the final product wax soluble, if it is to be used as a wax additive. Ammonia, amine or even metal salts of the copolymers, or of the partially esterified copolymers, or of the partially amidated or imidated copolymers, may also be used as addition agents for waxes.

The agent used for esterification, amidation or imidation may be either low molecular weight, such as ethyl alcohol, ethyl amine or diethylamine, or high molecular weight, such as octadecyl amine or dioctadecylamine. If a high decyl alcohol, octadecyl amine or dioctadecylamine. If a high molecular weight unsaturated compound has been used in the copolymerization with the dibasic acid, then a low molecular weight agent may be used for the modification step. On the other hand, if a low molecular weight olefin has been copolymerized with the dibasic acid, it may be necessary to modify with a high molecular weight agent in order to obtain good wax solubility.

One very suitable commercially available mixed alcohol suitable for esterification of the copolymer is a product obtained by hydrogenation of coconut oil. Such a product is sold commercially under the trade name, "Lorol," and is a mixture of saturated straight chain alcohols ranging from 10 to 18 carbon atoms, but having a major proportion of lauryl alcohol which has 12 carbon atoms. Other related products are made by separating this material, which may be considered as a crude mixture, into several different fractions having a relatively higher proportion of the higher, lower or medium constituent thereof. The composition of the commercial "Lorol" per se and other related products, "Lorol B" and "Lorol R," is approximately as follows:

|  | Lorol | Lorol B | Lorol R |
|---|---|---|---|
|  | Per Cent | Per Cent | Per Cent |
| $C_{10}$ | 4 | 3 | 1 |
| $C_{12}$ | 55.5 | 46 | 85 |
| $C_{14}$ | 22.5 | 24 | 13 |
| $C_{16}$ | 14 | 10 | 1 |
| $C_{18}$ | 5 | 17 | 1 |

In preparing the copolymer, approximately equimolar quantities of the dibasic acid derivative and the olefin are used. Polymerization catalysts may or may not be used. Among the useful catalysts are: benzoyl peroxide, tert.-butyl hydroperoxide, di-tert.-butyl peroxide, cumene peroxide, sunlight, ultra violet light, sodium and sodium amalgam. Peroxide catalysts are generally preferred. When a high molecular weight olefin is copolymerized, monomeric materials are generally charged into a flask with a diluent and catalyst and are heated to approximately 40 to 200° C., preferably 70 to 100° C. for a period of a few minutes to 24 hours. The modification agent is generally added with a suitable diluent and a catalyst such as sulfuric acid, phosphoric acid, hydrochloric acid, benzene sulfonic acid and p-toluene sulfonic acid. Water of esterification is removed as an azeotrope of the diluent. At the end of the reaction, the product is water-washed until neutral and the solvents are removed by vacuum distillation. Modification may result in partial or complete esterification, amidation or imidation.

A copolymer derived from a low molecular weight olefin may be formed by dissolving the dibasic acid derivative in a suitable diluent, heating to 50 to 200° C., adding catalyst dissolved in a solution of the same diluent and passing the olefin in gaseous phase into the mixture. Unreacted olefin may be returned to the system by a low temperature reflux condenser. The copolymerization may also be carried out under pressure in an autoclave.

During the copolymerization, it is preferred to exclude oxygen or air by any suitable means, such as by blowing the reaction mixture or the reaction vessel with an inert gas, such as nitrogen or carbon dioxide, or by displacing the air by refluxing solvent.

The products of this invention may be used in waxes in concentrations ranging from about 0.5% to 5%, or more, preferably from 0.1% to 1%.

When the modification of the copolymer is accomplished by condensing said copolymer with a primary or secondary amine, the same considerations with respect to chain length apply as they do with respect to esterification agents. That is to say, if a high molecular weight or long chain unsaturated compound has been used in the copolymerization step, a low molecular weight modification agent may be used. On the other hand, if a low molecular weight olefin has been copolymerized with the dibasic acid, it may be necessary to modify with a high molecular weight or long chain agent.

The amine or imine is generally added with a suitable diluent at a temperature ranging from 70° C. to 200° C., preferably from 100° to 150°, for a period of 2 to 20 hours.

It will be understood that although specific quantities of reactants are set forth hereinafter, it appears that the proportions of reactants may vary from about 1 to 4 mols of olefinic monomer to about one mol of dicarboxylic acid or anhydride. Similarly, the modification agent may range from 1 to 4 mols per mol of copolymer. The catalyst, where used, may vary from about 0.1 to 10% by weight based on the reactants.

The various types of waxes with which these polymers may be blended include paraffin wax, petrolatum, especially high melting point petroleum waxes, such as obtained from Pendoepo and Talang Akar crudes, various natural mineral waxes such as montan wax, ozokerite, carnauba wax and other types of waxes, such as spermaceti wax, beeswax, and the like, besides various synthetic waxes, such as those which have recently been produced by reacting high molecular weight organic acids, such as montanic acid, with iron, decomposing two molecules of the resultant iron salt to produce a ketone and hydrogenating a ketone to produce high molecular weight waxes of petroleum origin derived by special methods of treatment of wax-containing stocks. For instance, a high melting point wax may be prepared by distilling a petrolatum wax under conditions characteristic of superatmospheric distillation, diluting the distillate with a light petroleum distillate, and filter pressing the diluted distillate under temperature conditions, which give a sweatable cake of relatively low oil content, and then sweating the filter cake.

Instead of using individual waxes for compounding with the high molecular weight hydrocarbon polymer, it is sometimes desirable to use a mixture of two or more types of wax, for instance, paraffin wax and carnauba wax, where the high melting point and hardness of the carnauba wax is used to improve the softness and relatively low melting point paraffin wax. Also 5 to 10% of the synthetic waxes mentioned above may be used to increase the hardness of a soft wax so that the blend will have a hardness equivalent to carnauba wax. If a larger amount, for example, 18 or 20% of the synthetic wax is used, a composition may be obtained having a hardness even surpassing that of carnauba wax.

*Example 1*

49 grams of maleic anhydride (½ mol), 132 grams of 1-octa-decene (0.52 mol), and 200 ml. of xylene were charged into a flask and heated to 130° C. 3 grams of benzoyl peroxide in 60 ml. of xylene was added dropwise over a period of 2 hours with occasional stirring. Solvent and unreacted monomers were removed by heating to 200° C. at 1 mm. pressure. The residue (76 g.) was a viscous syrup. To this residue was added 500 ml. of benzene, 93 grams of Lorol B alcohol, and 3 grams of p-toluene sulfonic acid monohydrate, and the esterification carried to completion by removing the water of reaction as an azeotrope with the benzene. The reaction mixture was washed free of acid. The solvent and unreacted alcohol were removed by vacuum distillation, finishing at 200° C. pot temperature at 1 mm. pressure. The product (132 g.) was a light-colored, viscous oil. It was blended in various proportions with a refined wax melting at 140° F. The results are tabulated below:

|  | Oil Content | Tensile lbs/Sq. In. | N. F. Acid Test | M. Pt. |
|---|---|---|---|---|
| 140 M.Pt. Paraffin | 0.2 | 141 | 5 | 140 |
| 140 M.Pt. Paraffin + 1% Polymer | 0.2 | 324 | 5 | 140¾ |
| 140 M.Pt. Paraffin + 1.5% Polymer | 0.2 | 312 | 5 | 141 |
| 140 M.Pt. Paraffin + 2.0% Polymer | 0.2 | 340 | 6 | 141 |
| 140 M.Pt. Paraffin + 2.5% Polymer | 0.2 | 202 | 5 | 141 |
| 140 M.Pt. Paraffin + 3.0% Polymer | 0.2 | 172 | 5 | 141 |
| 140 M.Pt. Paraffin + 5.0% Polymer | 0.2 | 172 | 5 | 141 |

The above results show that the product is quite active in improving the tensile of high molecular weight wax even when used in concentrations of 1% by weight. In the past, other polymers, such as polyisobutylene, etc., have not increased the tensile of high molecular weight waxes, at 1% concentration, to a value of 324 lbs./sq. in. This is very important as large amounts of polymer always increase the viscosity of wax to where it is rather difficult to coat on paper at fast rates. Therefore, having high tensile with small amounts of polymer, say 1%, is an important property.

The nature and objects of the present invention having been thus fully set forth, what is claimed as new and useful and desired to be secured by Letters Patent is:

1. A composition consisting essentially of a major proportion of a paraffin wax and a minor proportion of a completely esterified aliphatic ester of an alkene-maleic anhydride copolymer wherein the esterification agent is a monohydric saturated alcohol.

2. A composition comprising a major proportion of a paraffin wax and 0.1 to 1% of a completely esterified copolymer of maleic anhydride and octadecene wherein the esterification agent is a saturated monohydric straight chain alcohol having from 1 to 24 carbon atoms.

3. The composition according to claim 2 in which the alcohol is a mixture of saturated monohydric alcohols having from 10 to 18 carbon atoms.

SAMUEL B. LIPPINCOTT.
DAVID W. YOUNG.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,454,284 | Kirk | Nov. 23, 1948 |